May 3, 1955 J. L. SEYMOUR 2,707,717
GLASS FURNACE AND METHOD OF FINING GLASS
Filed Feb. 10, 1950 2 Sheets-Sheet 1

INVENTOR.
BY *John L. Seymour*

May 3, 1955  J. L. SEYMOUR  2,707,717
GLASS FURNACE AND METHOD OF FINING GLASS
Filed Feb. 10, 1950  2 Sheets-Sheet 2

INVENTOR.
BY John L. Seymour

United States Patent Office 2,707,717
Patented May 3, 1955

2,707,717

GLASS FURNACE AND METHOD OF FINING GLASS

John L. Seymour, New Rochelle, N. Y.

Application February 10, 1950, Serial No. 143,474

14 Claims. (Cl. 13—6)

This invention relates to the process of making glass and to apparatus therefor.

The great problem in glass making is to get a homogeneous product, but methods and furnace constructions have militated against the attainment of a perfect result, particularly in continuous furnaces where the motion of glass from end to end, and the motion due to convection currents, and eddies due to construction combine to obstruct the glassmaker's search for homogeneity. Compartmentation, in which the hundreds of tons of glass in the furnace are separated by baffles into two or three pools, has produced improvement in, but have not wholly solved the basic problem.

It is an object of this invention to make, and particularly to fine, glass by a new method and a new apparatus. It is an object to fine glass with almost absolute uniformity, so that every cubic foot of glass will have had treatment substantially identical with every other cubic foot.

The objects of the invention are accomplished, generally speaking, by passing the glass through a long channel of relatively small cross-section, opposite walls of which are Joule effect electrodes of opposite polarity.

The invention, particularly as to apparatus, will be better understood by reference to the drawings, in which.

Figure 1:
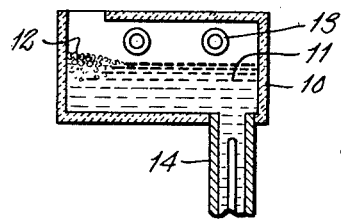
Figure 1 is a vertical sectional view, somewhat diagrammatic in character, of a new furnace.

In Fig. 1, there is shown a furnace having a tube 10 which receives molten glass 11, either by pouring it in from some outside source or by melting it from a lump of solid raw materials 12 by means of a heating source, of which flame burners 13 are illustrative. From the bottom of the tank at a place remote from the lump a carbon tube 14 extends downwardly. The tank 10 is shown as refractory and the tube as graphite. The tube is cylindrical as illustrated. The tube is connected at its bottom to a feeder 15, made of refractory as shown. Through the sole of the feeder a rod electrode 16, preferably graphite, extends axially into the tube, being adjustably mounted so that it may be extended into the tube 14 to different extents. An A. C. generator 17 supplies current to the tube and electrode by means of leads 18, 19 thus constituting them opposite poles of a Joule effect system. Thus, the tube and electrode constitute inner and outer, opposed, electrode walls, between which the glass flows in a stream of equal dimension at all opposed points. The current eventually passes equally through all parts of the stream from one electrode to the other. All parts of the glass may be subjected to fining by Joule effect for identical periods of time at identical intensity. The intensity may be varied by appropriate control of the current and both intensity and duration may be varied by inserting more or less of the electrode into the tube. Although there may be enough difference in temperature at the top of the tube to make a difference in conductivity the glass issues from the tube into the feeder 15 at uniform temperature and conductivity.

The bubbles of fining make their way up through the tube 14 and burst on the surface of the raw glass in tank 10, the bubbles becoming fewer in the midlength of the tube and being substantially absent from the glass at the feeder. The feeder is shown with valve 20 and discharge gate 21.

Figure 2:
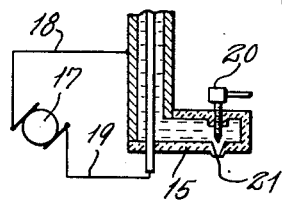
Figure 2 is a vertical sectional view of another type of furnace embodying the invention, taken on line 2—2 of Fig. 3.
Figure 2:
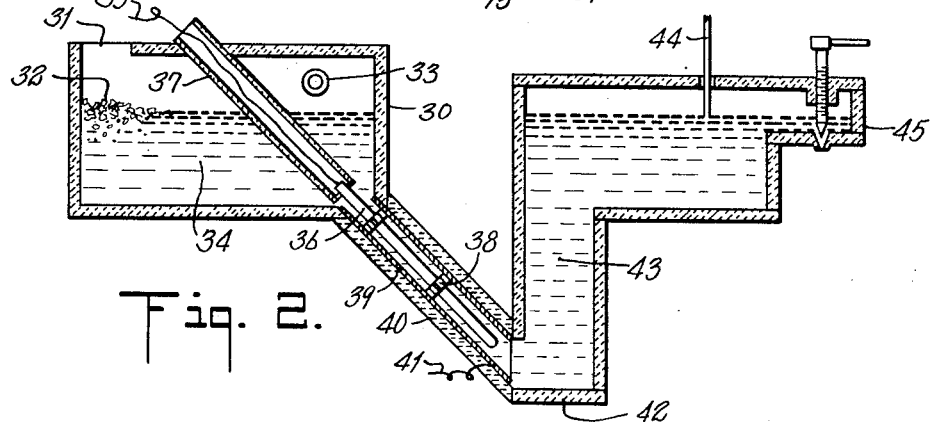
Figure 3:
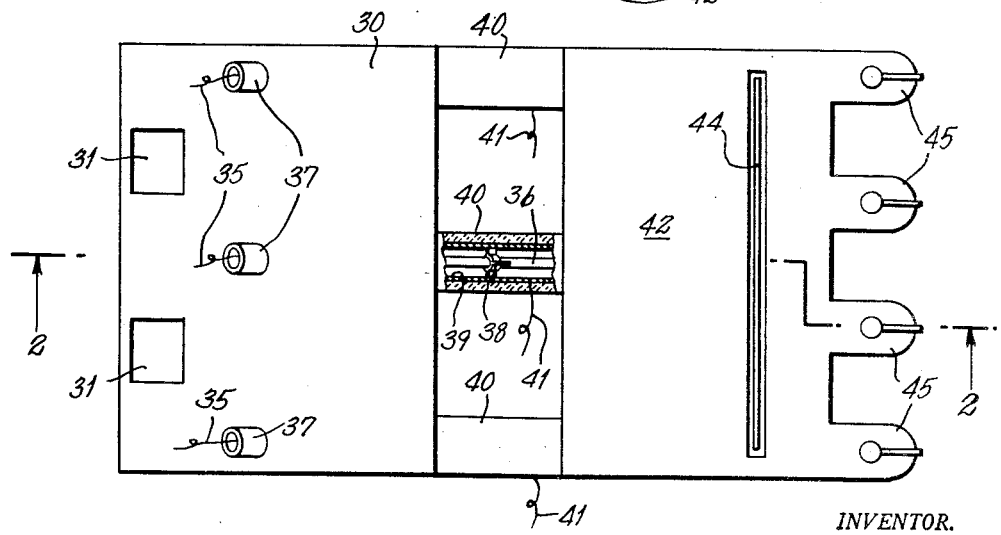
Figure 3 is a plan view of the furnace of Fig. 2, partly sectioned on line 3—3 of Fig. 2.

The structure of Figure 1 dispenses with cooling and homogenizing compartments, but cooling and storing compartments can be provided as in the apparatus of Figures 2 and 3.

In Figures 2 and 3, a tank 30 of appropriate refractory construction is fed through openings 31 with solid raw materials 32 which are melted by flame from burner 33. A refractory sleeve 37 extends through the roof of the tank at a 45° angle and enters the molten glass 34, and a conductor 35 extends through the sleeve and is connected to the end of rod electrode 36 which is affixed to the end of sleeve 37. By moving the sleeve longitudinally the position of the electrode may be changed. Guides 38 support the electrode on the axis of fining tube 39, of graphite, which is surrounded by insulation 40, and connected by lead 41 to one pole of a source of alternating current of which the other pole is connected to lead 35. The bearings 38 are refractory and non-conducting at the temperatures used. If they tend to short the current between the walls of the tube they can be omitted, support being from one end alone, or the lower end of the electrode can be passed out through the bottom of the storage and cooling tank.

A battery of three fining tubes is shown, connecting at their upper ends with tank 30 and at their lower ends with storage tank 42. This tank has a riser 43 that accepts the glass from the fining tubes and receptacle 44 that holds the glass in limpid condition until it is drawn as a sheet 44 or poured through feeders 45.

In this case also, the bubbles from fining find their way upward and back to the raw glass tank.

Figure 4:
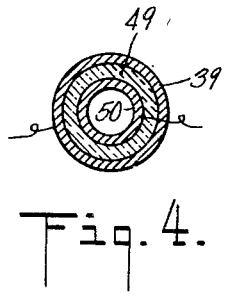
Figure 4 is a cross section through a modified fining tube composed of inner and outer walls both of which are tubular.
Figure 5:
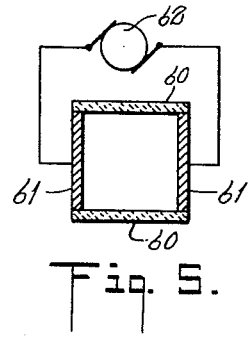
Figure 5 is a further modification showing a tube having composite walls opposed sections of which are conductive, the intermediate sections being non-conductive.

In the illustrations the area of the outer is much greater than that of the inner electrode. This disproportion can be reduced if desired by enlarging the inner electrode 50 as shown in Figure 4, each electrode comprising a hollow tube, between which tubes the glass flows, as indicated at 49. In some cases tubes can be constructed having opposite wall sections of conductive material to serve as electrodes, the intermediate parts of the walls being non conductive. This is diagrammatically shown in Figure 5. In that figure tube walls 60 are non conductive and 61 are conductive and connected to opposite poles of an A. C. current source 62.

Figure 6:
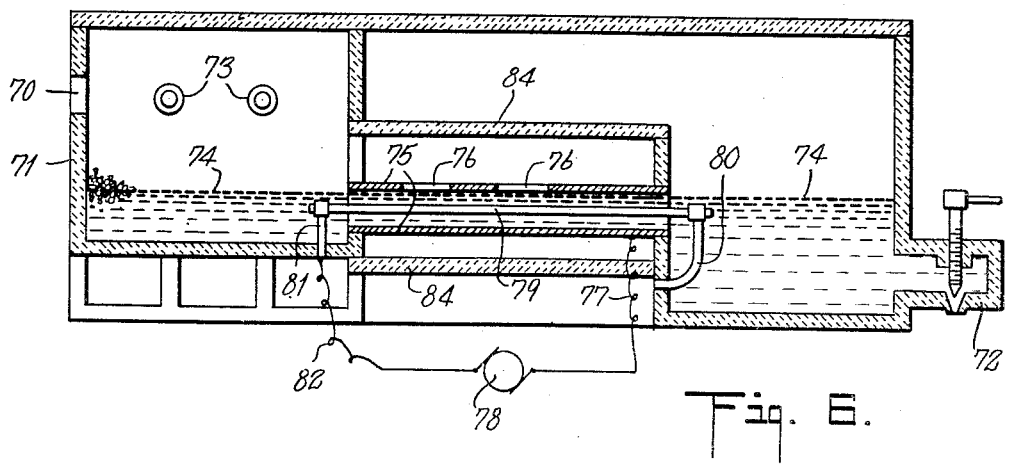
Figure 6 is a vertical sectoinal view through a furnace of modified design having preferred features; and, Figure 7 is an enlarged detail, in section embodying a modification.

In Figure 6 the numeral 70 indicates a general enclosure within which are two tanks 71, 72, the first of which is comparatively shallow. It constitutes the tank in which the raw molten glass is received, or is formed from solid raw materials by melting, the burners 73 being diagrammatic illustration for a source of heat for melting or for keeping the glass molten. The tank 72 is a reservoir for finished glass and a cooling tank. A common glass level is indicated in both tanks by the numeral 74. Between the tanks extends a carbon tube 75 provided on its upper side with narrow longitudinal slots 76 at the apex of the tube, which in this instance is circular. This tube extends between tank 71, 72 and constitutes a channel through which the glass from the first can flow to the second. This tube 75 is preferably made of graphite, but its basic requirement is that it should be refractory and electrically conductive. An electric conductor 77 is attached to it and to one pole of a source of alternating current 78. An electrode 79 extends axially through the tube 75 from end to end and is supported by a refractory bracket 80 at one end and by a hollow support 81 at the other end. An electric lead 82 extends from the other pole of the A. C. source 78 to the end of the electrode 79.

In operation, the furnace is operated so that the tube 75 is filled with glass. The unfined glass enters the tube from tank 71 and is subjected to fining by Joule effect passing through the glass between electrode 79 and tube 75. The gases which are liberated during the fining of the glass escape through vents 76. Control of fining is by length of tube, velocity of glass, and energy input. A short tube carrying glass at low speed will accomplish complete fining, a long tube carrying glass at higher velocity will produce a like result assuming identical input of current per weight of glass treated, and the output rate and degree of fining can be affected in all tubes by changing the energy input per weight of glass made.

In a modification of the invention, the tube 75 may be enclosed within a chamber 84 and this chamber may itself be heated or may contain inert gas to prevent oxidation of the hot tube. The tube may be coated with refractory material, externally.

Figure 7:
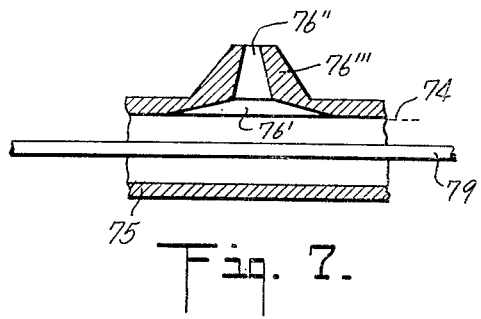

In Figure 7 is shown a modified tube structure in which the vents 76' are long and are internally bevelled to lead escaping gases to the vent, are constricted to openings 76'' to prevent gases in chamber 84 from having too free entrance to the glass in the tube, and have erections 76''' which compensate for increases in the level of the glass in the tanks.

As many apparently widely different embodiments of the present invention may be made without departing from the spirit and scope thereon, it is to be understood that the invention is not limited to the specific embodiments.

What is claimed is:

1. A glass furnace having a tank constructed and arranged to receive glass raw materials, means to melt the materials in the tank, an electrically conductive tube opening into said tank in a position to receive the glass therefrom, a rod electrode extending through said tube and spaced from the tube throughout its length providing space for the flow of glass from the tank between tube and rod, said tube and rod electrode being constructed and arranged for connection to opposite poles of an alternating current source, and opposite poles of a source of alternating current attached to said tube and electrode respectively.

2. The furnace of claim 1 in which the electrode is movable in and out of the tube.

3. A glass furnace having a tank for the reception of crude molten glass and a fining device opening into said tank in a position to receive crude glass therefrom, said fining device having a plurality of elongated, electrically conductive walls extending from said tank and electrically insulated from each other, current supply means of fining intensity connected to said walls whereby to pass current from wall to wall through the glass, constituting the said walls opposite poles of a Joule effect fining system, each said wall being of substantially uniform dimensions from end to end of those parts which contact the glass, said electrode walls being overlapped and sufficiently long to substantially complete the fining of the glass before it is discharged therefrom.

4. The method of fining molten glass that comprises passing it from end to end between concentric elongated walls constituting Joule effect electrodes, and passing alternating current through the glass from wall to wall of the concentric electrodes.

5. A fining apparatus, for crude unfined glass, having an elongated, electrically conductive tube open at one end to receive the unfined glass, an electrically conductive core extending axially through said tube, opposite poles of a source of electric power of glass fining intensity connected to said tube and core and constituting said tube and core opposite poles for the passage of current from one to the other through glass in the tube, said tube and core being electrically disconnected from each other except in the presence of molten glass, means to pass molten glass through said tube in contact with tube and core, and means to discharge fined glass from said tube.

6. A glass furnace having two tanks with a common glass level, said tanks being connected at the glass level by an electrically conductive fining tube having a vent, an electrically conductive core in said tube and spaced therefrom to provide for the flow of glass therebetween from tank to tank, and current supply means connected to said tube and core whereby to pass current from one of them to the other through glass in the tube throughout the length of their concentric parts, the length of said concentric parts being sufficient to produce substantial fining of the glass which passes through said tube.

7. A glass furnace having a tank for receiving glass raw materials and for holding crude molten glass, combustion means for heating said tank, an elongated, electrically conductive tube connected to said tank in a position such that molten glass from the furnace will flow into the tube, an electrically conductive core extending through the tube and spaced from the tube throughout its length, electric power supply means connected to the tube and to the core constituting them opposite poles for passing current through glass in the tube, and receptacle means connected to the end of the tube opposite said tank to receive glass discharged from said tube.

8. The method of fining molten glass that comprises flowing unfined molten glass from end to end of an elongated field of alternating current of cross section small relative to its length, said field of current being passed through said glass in a direction transversely to the flow of the glass and the length of the said field, the extent of said field and the extent of the stream of glass flowing through said field being substantially identical from end to end of said field, the length of said elongated field of current and the intensity of the current in said field being proportioned to produce a fined glass at the end of said field.

9. The method of fining crude molten glass that comprises forming a flowing, elongated stream of approximately uniform section, and passing electric current of fining intensity through a sufficient length of said stream between the center of the stream and the outer surface thereof to fine the glass.

10. A fining apparatus, for crude unfined glass, having an elongated, electrically conductive tube open at one end to receive the unfined glass, an electrically conductive core extending axially through said tube, opposite poles of a source of electric power of glass fining intensity connected to said tube and core and constituting said tube and core opposite poles for the passage of current from one to the other through glass in the tube, said tube and core being electrically disconnected from each other except in the presence of molten glass, means to pass molten glass through said tube in contact with tube and core, and means to discharge fined glass from said tube.

11. A glass furnace having a tank for the reception of crude, unfined molten glass and a fining device comprising an electrically conductive tube having an orifice opening into said tank in a position to receive the glass therefrom, means to flow glass from said tank through said tube, means to receive the glass issuing from said tube, an electrically conductive core extending axially into said tube and parallel to the wall thereof, and means to pass current of fining intensity from tube to core through the glass flowing through said tube.

12. The furnace of claim 11 in which the opposed walls are long in comparison to the diameter of the tube.

13. The method of fining crude glass that comprises forming a pool of crude glass, forming from said pool a pipe-shaped stream of glass having a diameter small with respect to its length, and passing through said flowing stream, transversely to its direction of flow a field of alternating current, said field having a length and intensity sufficient to transform the flowing crude glass to fined glass, the cross section of said flowing stream being such that all parts thereof are subjected to substantially the same heat treatment by the field.

14. A glass furnace having two tanks with a common glass level, said tanks being connected by an electrically conductive fining tube having a vent, an electrically conductive core in said tube and spaced therefrom to provide for the flow of glass therebetween from tank to tank, and current supply means connected to said tube and core whereby to pass current from one of them to the other through glass in the tube throughout the length of their concentric parts, the length of said concentric parts being sufficient to produce substantial fining of the glass which passes through said tube.

References Cited in the file of this patent

UNITED STATES PATENTS

| | | |
|---|---|---|
| 391,034 | Eames | Oct. 16, 1888 |
| 469,454 | Rogers | Feb. 23, 1892 |
| 745,863 | Kessmeier | Dec. 1, 1903 |
| 865,016 | Clark | Sept. 3, 1907 |
| 1,051,036 | Voelker | Jan. 21, 1913 |
| 1,267,317 | Erskine | May 21, 1918 |
| 1,438,936 | Eimer | Dec. 12, 1922 |
| 1,458,522 | Clark | June 12, 1923 |
| 1,467,044 | Kiefer | Sept. 4, 1923 |
| 1,470,195 | De Roiboul | Oct. 9, 1923 |
| 1,799,371 | Hitner | Apr. 7, 1931 |
| 1,815,978 | Hitner | July 28, 1931 |
| 1,851,575 | Greene | Mar. 29, 1932 |
| 2,022,112 | Ferguson | Nov. 26, 1935 |
| 2,143,951 | Lambert | Jan. 17, 1939 |
| 2,159,361 | Atkinson et al. | May 23, 1939 |
| 2,179,224 | Soubier | Nov. 7, 1939 |
| 2,188,927 | Slayter | Feb. 6, 1940 |
| 2,314,956 | Slayter et al. | Mar. 30, 1943 |
| 2,540,415 | Altman | Feb. 6, 1951 |